United States Patent [19]

Nimmersjo

[11] 4,053,816
[45] Oct. 11, 1977

[54] PROTECTION MEANS FOR OBJECTS INCLUDED IN ELECTRICAL POWER SUPPLY NETWORKS

[75] Inventor: Gunnar Nimmersjo, Vetterslundsgatan 20, S-724 62 Vasteras, Sweden

[73] Assignee: ASEA Aktiebolag, Vasteras, Sweden

[21] Appl. No.: 629,787

[22] Filed: Nov. 7, 1975

[30] Foreign Application Priority Data

Nov. 21, 1974 Sweden .................. 7414614

[51] Int. Cl.² .............................................. H02H 3/26
[52] U.S. Cl. .......................................... 361/62; 361/84; 361/110
[58] Field of Search ............. 317/36 D, 27 R, 43, 317/50, 26–29; 324/52

[56] References Cited

U.S. PATENT DOCUMENTS

| | | |
|---|---|---|
| 3,612,989 | 10/1971 | Souillard et al. ............... 317/36 D |
| 3,878,460 | 4/1975 | Nimmersjo .................. 317/27 R X |
| 3,890,544 | 6/1975 | Chamia ........................ 317/27 R |
| 3,938,007 | 2/1976 | Boniger et al. ................. 317/27 R |
| 3,956,671 | 5/1976 | Nimmersjo ........................ 317/43 |

*Primary Examiner*—J. D. Miller
*Assistant Examiner*—Patrick R. Salce
*Attorney, Agent, or Firm*—Watson, Cole, Grindle & Watson

[57] ABSTRACT

In an arrangement for level and sequence detection in a directional wave detector, which has a three-phase directional wave detector with two inputs per phase and three single phase and one three-phase tripping output and one three-phase blocking output, with a level detector with one partial detector for each of the single-phase tripping outputs and the three-phase blocking output, the level detector is provided with a further partial detector which is connected to the three-phase tripping output of the wave detector and the two partial detectors which are connected to the three-phase outputs of the wave detector have a lower reference level than the other partial detectors which are connected to the single-phase tripping outputs of the wave detector.

2 Claims, 3 Drawing Figures

$\tau_2 < \tau_3$

PROTECTION MEANS FOR OBJECTS INCLUDED IN ELECTRICAL POWER SUPPLY NETWORKS

BACKGROUND OF THE INVENTION

1. Field of the Invention

The invention relates to a protection means for objects included in an electrical power supply network.

2. The Prior Art

In Nimmersjo application Ser. No. 493,915, filed Aug. 1, 1974, which issued as U.S. Pat No. 3,956,671 FIGS. 2 and 3 show a proposal for level and sequence detection in a directional wave detector. This solution can at least theoretically provide an unselective tripping in certain cases. If we assume that a power line connects three consecutively positioned stations A, B and C, there will be two line paths A-B and B-C. Each station has two protection means, each one sensing a fault which occurs but giving a tripping signal to its breaker only if the fault is detected as lying ahead. The station B, lying between A and C, has a protection means B1 which supervises the distance B-A and a protection means B2 which supervises the distance BC. A fault at a point $a$ on the line between A and B will therefore be detected by the protection means B1 as a fault lying ahead, whereas the protection means B2 detects the same fault as a fault lying behind. In station C, the protection means C1, which supervises the distance C-B, will detect the fault as a fault lying ahead, since it lies outside the range of protection of the protection means but in its direction of supervision. The protection means in station B are furthermore arranged, in the event of a fault lying behind, to emit a blocking signal to the opposite protection devices A2 and C1, respectively, so that these do not emit a tripping signal to the breakers. In the case mentioned above, the protection means B2 is thus supposed to emit a blocking signal to the protection means C1 so that this latter protection means does not emit a signal for disconnection of the line C-B. This is explained in the last paragraph of page 4 of the patent.

The object of the level detector NB in FIG. 2 in the patent is to block the blocking signals which are below a certain level. Because of reflection in station C of the voltage wave which emanates from the source $a$ of the fault, it is theoretically possible that such a great change in voltage may appear in station C that the level of the output signal from the wave detector C1 in C, which is in the tripping direction, will be greater than the blocking level of the wave detector B2 in B. It is therefore theoretically possible that the level for tripping can be exceeded in C without the level for blocking being reached in B, which means that the line B-C will be incorrectly disconnected upon a fault in the line A-B.

SUMMARY OF THE INVENTION

The present invention aims to achieve a modification of the network protection means according to the prior application.

According to the invention, the level detector is provided with a further partial detector which is connected to the three-phase tripping output of the wave detector, and the two partial detectors which are connected to the three-phase outputs of the wave detector have a lower reference value than the other partial detectors of the level detector which are connected to the single-phase tripping outputs of the wave detector.

BRIEF DESCRIPTION OF THE DRAWINGS

In the accompanying drawing.

DESCRIPTION OF THE PREFERRED EMBODIMENTS

Figure 1:
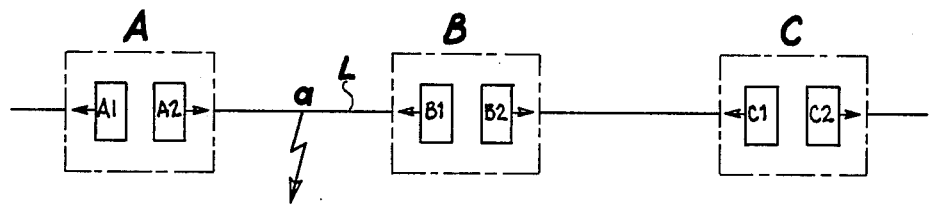
FIG. 1 shows schematically a power supply line having three stations.

FIG. 1 shows a power supply line L with three stations A, B, and C. In each station there are two directional protection means A1, A2; B1, B2 and C1, C2, respectively. This means that, for example, the line between A and B will be supervised by protection means A2 and B1, which is indicated by an arrow directed at the respective protection means. Thus, each protection means senses a fault in the direction of its arrow as being a fault lying ahead, for which it tends to release. A fault at $a$ on the distance A-B is interpreted by protection means A2, B1 and C1 as a fault lying ahead, whereas protection means A1, B2 and C2 interpret the fault as one lying behind.

Figure 2:
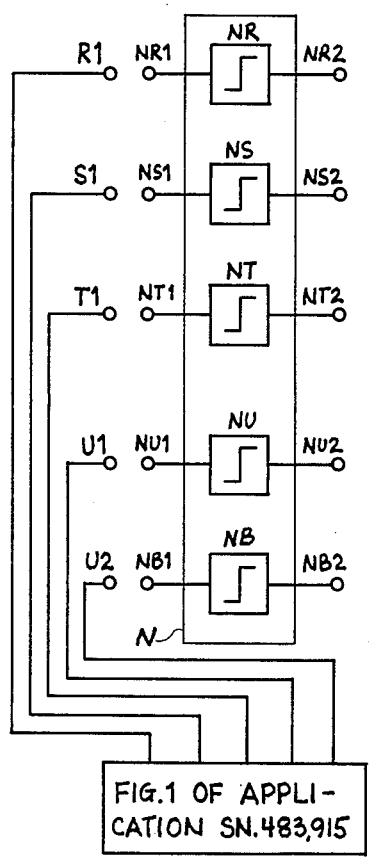
FIGS. 2 and 3 show how the corresponding devices in the above application have been modified in accordance with the invention.

The protection means in question has a level detector, shown in FIG. 2. The level detector prevents the protection means from acting in response to minor disturbances which normally occur on the line without being real faults or serious disturbances.

In the level detector N in FIG. 2 of the above application, the different partial detectors have the same level. This being the case, it could theoretically happen that if, at $a$ in FIG. 1 of the present application, a fault occurs whose transients give rise to a signal in the protection means A2 and B1 which lies above the level set, the protection means will react. However, the transient wave generated by the disturbance proceeds to a certain extent past B on to C, where it is reflected, and the amplitude of the voltage transient rises and may rise so high that the triggering signal will become higher than the level set in C1, which will cause C1 to sense the disturbance in $a$ as a fault lying ahead and to release if the protection means C1 has not been blocked by B2, because the blocking signal there was somewhat below the set level.

To prevent such an undesired release, the level detector N in the protection means is provided with an additional partial detector NU, to which the tripping signal U1 from the wave detector WD in FIG. 1 of the main application is supplied. Further, both NU and NB are given a lower level than the other three partial detectors NR, NS, NT. As an example of the lower level, it may be mentioned that NU and NB have a level of 60–90% of the level of the other partial detectors.

Figure 3:
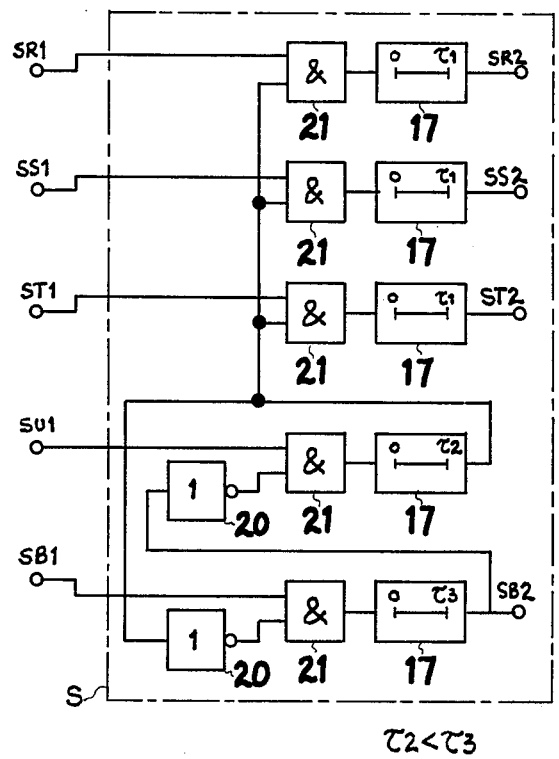

Each of the outputs NU2 and NB2 is connected to a partial detector in the sequence detector S in FIG. 3 by way of the inputs SU1 and SB1, respectively. The two partial detectors are built up of an inverter 20 and an AND gate 21 and the previously shown delay device 17 with delayed re-set. The delay for the upper detector, the tripping detector, is $\tau 2$ and for the lower, the blocking detector, $\tau 3$, $\tau 2$ being smaller than $\tau 3$.

With reference to the previously related case, upon a fault at $a$ when the signal did not fully reach to the higher level in B2, the protection means B2 now senses the disturbance as a fault lying behind, for which the protection is to block. Because of the lower level of the partial detector NB in the level detector of the protection means, the disturbance wave will now be sufficiently high for a signal to appear on the output NB2 and be supplied to the blocking partial detector in the sequence detector S. The latter receives a blocking signal on its output SB2, which blocks its own protection means over the tripping partial detector by having a safe "zero" on its output and therefore blocks the AND gates 21 on the three upper partial detectors. The blocking signal on the output SB2 is also supplied to the protection means C1 as a blocking signal, so that this protection means is also blocked. The protection means C1 will thus be blocked even if the level of the incoming disturbance signal after the reflection in C is higher than the level of the partial detectors NR, NS or NT.

Generally it can be said that the levels in the partial detectors NU and NB in the level detector N are set so low that a disturbance lying below this level will certainly not bring about a release in another protection means after reflection in the station.

The lower level of the partial detector NU has no significance in case of faults lying ahead, for which the amplitude of the incoming tripping signal on R1, S1 and T1 of the level detector lies between the level value of the two lower and the three upper partial detectors in the level detector N. It is true that the tripping detector will emit a signal on the lower input to the AND gates 21 in the three one-phase partial detectors, but since no signal occurs on the upper inputs no release will take place. The lower level will thus determine the direction, whereas the higher level still provides a criterion for the tripping signal to the breaker.

I claim:

1. Protection means for objects included in electrical power supply networks, comprising a three-phase directional wave detector with two inputs per phase, three single-phase and one three-phase tripping output, one three-phase blocking output, and one level detector with one partial detector for each of the single-phase tripping outputs and the three-phase blocking output, said level detector is provided with a further partial detector connected to the three-phase tripping output of the wave detector, and said two partial detectors are connected to the three-phase outputs of the wave detector and have a lower reference level than the other partial detectors of the level detector and are connected to the single-phase tripping outputs of the wave detector.

2. Protection means according to claim 1, in which the reference level of the two partial detectors in the level detector, which are connected to the three-phase outputs of the wave detector is so low that a disturbance in the power supply network, which causes signals lying below this level, will not cause a release in any other protection means in the network after reflection at the place where said protection means is located.

* * * * *